Figure 1:
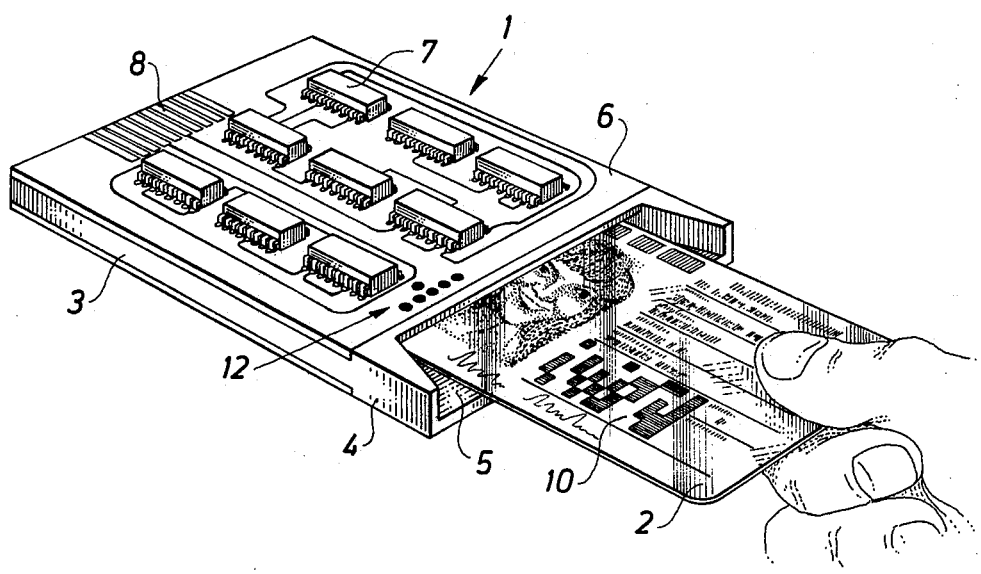

United States Patent [19]
Högberg et al.

[11] 3,976,857
[45] Aug. 24, 1976

[54] METHOD AND AN ARRANGEMENT FOR READING CODED INFORMATION FROM A DATA CARRIER

[75] Inventors: Knut Goran Högberg, Vallingby; Olof Wilhelm Meurling, Osmo, both of Sweden

[73] Assignee: AB ID-Kort, Sweden

[22] Filed: Nov. 29, 1974

[21] Appl. No.: 528,570

[30] Foreign Application Priority Data
Nov. 30, 1973 Sweden .............................. 7316254

[52] U.S. Cl. ............................ 235/61.11 E; 250/566
[51] Int. Cl.² ........................ G06K 7/10; G08C 9/06
[58] Field of Search ............... 235/61.11 E, 61.7 B; 340/149 A, 146.3 K, 146.3 Z; 250/555, 566

[56] References Cited
UNITED STATES PATENTS

| 3,663,800 | 5/1972 | Myer et al. | 235/61.7 B |
| 3,673,389 | 6/1972 | Kapsombelis et al. | 235/61.7 B |
| 3,704,360 | 11/1972 | McFodder | 235/61.7 B |

Primary Examiner—Daryl W. Cook
Attorney, Agent, or Firm—Burns, Doane, Swecker & Mathis

[57] ABSTRACT

A method of and an apparatus for reading a manually fed data carrier are disclosed. The data carrier has at least one line of coded positions and is fed manually past reader means including at least one pair of reader means which viewed in the direction of motion of the data carrier are spaced apart by a distance less than the extension of a coded position in said direction. Said pair of reader means detects the direction of motion of the data carrier each time a transition between two successive positions passes said reader means. If the detected direction is opposite to the given read-out direction, the count of a counter is increased with one unit. If the detected direction corresponds with the given direction, the count of the counter is reduced with one unit provided that the count exceeds zero. If the direction corresponds with the given direction and the count is zero, read-out result is fed out. Consequently, correct read-out is accomplished irrespective of the movement of the data carrier past the reader means; for instance it does not matter if the data carrier is temporarily pulled back and thereafter fed foreward again or if the data carrier is fed jerkily.

47 Claims, 23 Drawing Figures

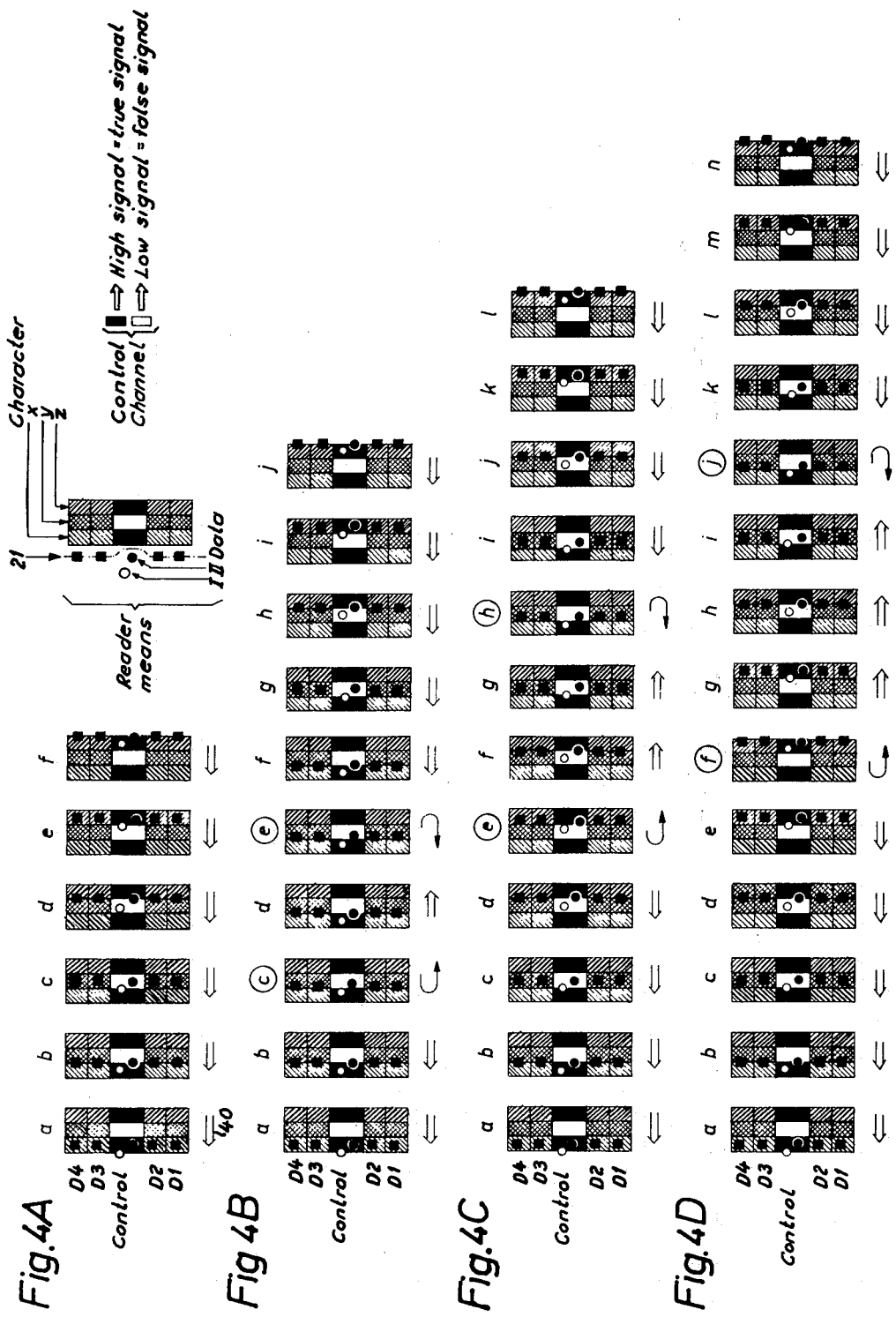

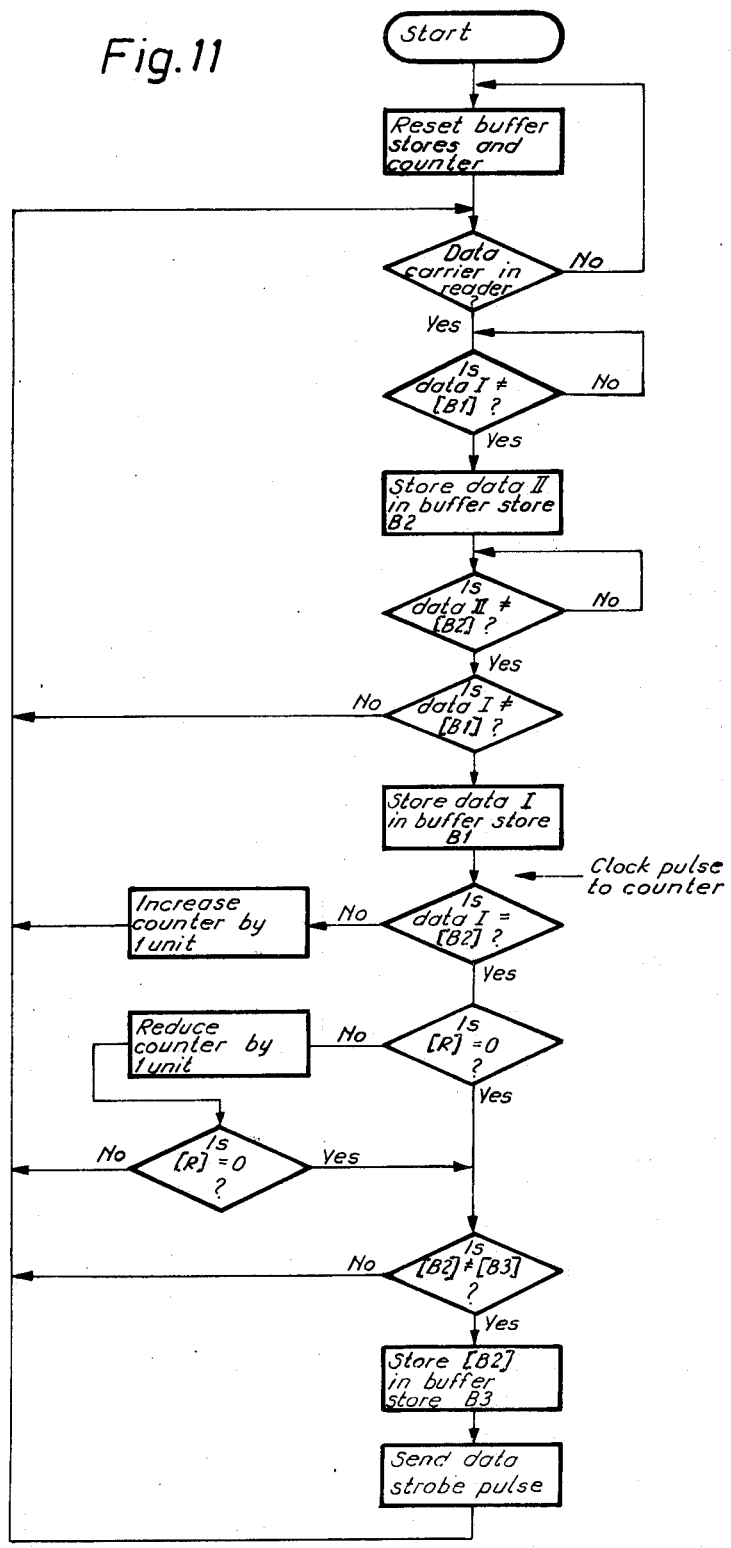

METHOD AND AN ARRANGEMENT FOR READING CODED INFORMATION FROM A DATA CARRIER

The present invention relates to the read-out of coded information from an information or data carrier, in particular from an identity card, an authorisation pass or the like. The invention relates in particular to a method of and an arrangement for reading a data carrier upon which information is present in the form of one or more lines of coded, preferably binary coded, positions, each position in a specific line or alternatively the positions in each column of the columns formed by a predetermined number of lines forming a character, and the data carrier and reader means being made to perform a relative motion so that the line or lines, relatively speaking, are displaced past the reader means for read-out.

Known readers used to read coded cards are built as a rule either on the principle in accordance with which the card is fed at constant speed past a reader means, so-called dynamic readers, or upon the principle in accordance with which the whole of the information content of the card is accessible simultaneously for read-out, these are so-called static readers. As far as dynamic readers are concerned, it is a fact of course that they require a minimum in terms of the number of reader means but on the other hand they occupy a great deal of space owing to the fact that there shall be no possibility of affecting card transport inside the reader. Static readers, on the other hand, can be made very compact and simple but are open to the drawback that they require a large number of reader means.

The object of the present invention is to bridge the gap between the above method and to upon card feed. Thus, it shall make no difference whether the card, possible to effect read-out of, for example, a card, while feeding the latter manually past the reader means, for example when the card is introduced into or withdrawn from a reader, without any special requirements having to be imposed upon card, once it has been fed some distance past the reader means, is suddenly pulled back a certain amount and thereafter fed forward again, or whether the card is fed jerkily.

The above objective is achieved by virtue of the fact that the method and arrangements in accordance with the invention have the features specified in the attached claims.

The method of the invention accordingly essentially comprises the steps that the direction of the data carrier motion relatively to said reader means is detected; that if the direction of the relative motion is opposite to a given read-out direction, a count is counted up based upon the number of characters which pass said reader means; that if the direction of the relative motion corresponds with the given read-out direction, the count is counted down based upon the number of characters passing said reader means until the count reaches zero; and that if the direction of the data carrier relative motion corresponds with the given read-out direction and the count is zero, the result of read-out of the position or positions in one character and/or other positions simultaneously read on the data carrier, is fed out.

In the case where two successive ones of said characters on the data carrier are always different it is suitable to read said character using first and second reader means which, viewed in the direction of the relative motion between data carrier and reader means, are separated by distance which is less than the width of a position in said direction, the direction of motion of the data carrier relatively to the reader means being determined by a comparison between results obtained from read-out respectively by said first and second reader means.

In particular where each of said characters comprises only one binary coded position, which implies that the data carrier is provided with a "control channel" comprising one line, the count will preferably be modified every time said first reader means reads out a new character, this on the basis of a comparison between the new character which said first reader means is beginning to read and the character said second reader means is reading. Preferably, as the said first reader means, the means which is located foremost viewed in the direction of motion of the data carrier relatively to the reader means, will be used, this direction corresponding with the given read-out direction, in other words when the data carrier is fed in the given read-out direction it passes first of all said second reader means and thereafter said first reader means so that when the result of said comparison is parity the count is reduced by one, if the count is greater than zero, and the result of read-out is fed out if the count is zero. The result of read-out can include a control or strobe signal, corresponding with a control channel on the data carrier, and/or data from other read-out positions on the data carrier, that is to say as a general rule data which are read out simultaneously with the possibly likewise fed out control signal, using separate data reader means.

When the number of possible characters is greater than two, that is generally if each character includes two or more binary coded positions and the characters are data to be read out, then it is necessary to use as first reader means means which are located foremost viewed in the direction of motion of the data carrier relatively to the reader means, which corresponds with the given read-out direction, because the probability that two successive characters will be different is not the same as the probability that two successive characters will be the same. Furthermore, it is suitable in this context to store the character read out by said second reader means, when said first reader means commences to read a new character, and, thereafter to execute said comparison by comparing said stored character and the character said first reader means reads out not until said second reader means is reading out a new character. In this way, it is ensured that all the first reader means are properly over the character which is to be read out, at the time of comparison, quite irrespective, for example, of whether the data carrier might be misaligned relatively to the reader means, something which could otherwise mean that the first reader means would not begin simultaneously to read out the respective new positions. On the other hand, the character transition is reliably detected as soon as the value read out in respect of any position changes. Each new character read out by said first reader means, is suitably stored when said second reader means is reading out a new character, the fact that said first reader means is reading a new character being detected by comparing the character last stored with the character being read by said first reader means. The foregoing direction-determining comparison can accordingly be effected between said stored characters read by said first and second reader means. This kind of intermediate storage, which can be made self-controlled, prior to comparison, is extremely valuable in securing reliable read-out.

According to another aspect of the invention, the method involves the alternating use of said first reader means in order to detect a transition between successive characters and said second reader means for character read-out, and of said first reader means for character read-out and said second reader means to detect a transition between successive characters, character read-out taking place when a transition between successive characters is detected by the reader means acting for that purpose and changeover taking place after character read-out, the result obtained with read-out by means of said first and second reader means acting as character reader means being compared for the purpose of determining the direction of relative motion between the data carrier and the reader means.

It is suitable here, when said first reader means acting as transition detecting means detects a transition, to store the character read by the said second reader means and to compare the character read by said first reader means with the stored character in order to generate a signal indicating the direction of relative motion between data carrier and reader means. It is advantageous, furthermore, and indeed a necessity where the number of different characters exceeds two, to employ as said first reader means the means which is located foremost viewed in the direction of motion of the data carrier relatively to the reader means, which corresponds with the given read-out direction, which means that at said comparison parity indicates that the direction of relative motion is the intended direction of read-out, and disparity indicates that the direction of relative motion is contrary to the intended direction of read-out.

The method suitably also includes the features that each character transition passing said first or alternatively said second reader means is detected; that in respect of each such character transition the count is modified in accordance with said signal and the magnitude of said count; and that when the count is zero and said signal indicates that the direction of relative motion corresponds with the given read-out direction, on detection of such a character transition the read-out results are fed out.

An alternative to this procedure is to include the steps that when said second reader means, acting as transition detector means, detects a character transition, the count is modified in dependence upon said signal and the magnitude of said count and provided that the character being read by said first reader means differs from the character read by said first reader means when said second reader means, acting as transition detector units, detected the preceding character transition; and that when the count is or becomes zero, read-out results are fed out, with the further provision that the stored character which was read by said second reader means differs from the stored character which was held in the store on the occasion of the preceding feed out.

In accordance with the above-mentioned second aspect of the invention, it is also possible to employ as said first reader means, the reader means which is located foremost, viewed in the direction of motion of the data carrier relatively to the reader means, which corresponds with the given read-out direction; to store when said first reader means, operating as transition detector means, detects a transition, the character said second reader means is reading; to store when said second reader means, operating as transition detector means, detects a transition, the character said first reader means is reading; to compare, provided that the latter character differs from the previously stored character which was read out by said first reader means, the stored characters; to increase a count by one unit if the compared characters differ from one another; to reduce the count by one unit if the characters exhibit parity, provided that said count exceeds zero; and if the characters exhibit parity and the count is or becomes zero, to feed out read-out results provided that said like characters differ from the like characters which were involved with the previous occasion of feed out.

If said characters embrace only two different kinds of characters, then the condition governing which reader means shall be considered as the first, need not apply. The method in accordance with said second aspect can then include the steps that when said first reader means, acting as transition detector means, detects a transition, the character being read by said second reader means is stored; that when said second reader means, acting as transition detector means, detects a transition, the character being read by said first reader means is stored; that provided that the latter character differs from the character previously stored and read out by said first reader means, the stored characters, which may be identical to one another or differ from each other are compared; that if the comparison yields one result a count is increased by one unit; that if the comparison yields the other result, the count is reduced by one unit, provided that the count exceeds zero; and that if the count yields said other result and the count is or becomes zero, read-out results are fed out, provided that the character last stored differs from the last stored character associated with the preceding occasion of feed out.

The arrangement in accordance with the invention is characterized essentially by the fact that it comprises a counter; means for supplying clock pulses to the counter in dependence upon the number of characters which pass reader means; means for detecting the direction of motion of the data carrier relatively to said reader means in order to produce a control signal to the counter so that the counter, when said direction of motion is opposite to a given read-out direction, counts up or forward in respect of each clock pulse and so that the counter; when said direction of motion corresponds with the given direction of read-out, counts down or backwards, provided that the count exceeds zero; and means arranged to control, in dependence upon the count of the counter, the feeding out of results of the read-out by said reader means, of said character and/or other information carried by the data carrier.

In the event of two successive ones of said characters on the data carrier are always different, the arrangement will preferably comprise first and second reader means which, viewed in the direction of relative motion between data carrier and reader means, are spaced apart by a distance which is less than the width of a coded position in said direction, and are arranged to read out said characters, said means for producing counter control signals including comparator means arranged to compare the results obtained from read-out by said first and said second reader means.

Suitably one input of said comparator means is connected to said first reader means and the other input to said second reader means. Particularly if each character comprises more than one position, however, it is advantageous for at least one of the inputs to said comparator means, to be connected to the associated reader means via an intermediate storage means. In accordance with one embodiment, the arrangement is therefore characterized in that a first buffer store and one input of a first comparator, are connected to said first reader means, whilst the other input of the first comparator is connected to the output of the first buffer store; and in that a second buffer store and one input of a second comparator, are connected to said second reader means, whilst the other input of said second comparator is connected to the output of said second buffer store, input into the first buffer store being arranged to take place when the output signal from the second comparator indicates disparity and input into the second buffer store being arranged to take place when the output signal from the first comparator indicates disparity, and at least one of the inputs to said comparator means being connected to the output of the buffer store belonging to the associated reader means.

Said means for supplying the clock pulses suitably include means for producing a pulse every time said first or said second reader means read a transition between successive characters. Accordingly, said means for supplying clock pulses can comprise a buffer store and a comparator, the input of the buffer store and one input of the comparator being connected to said first or alternatively said second reader means, and the output of the buffer store being connected to the other input of the comparator, the output signal from the comparator, when disparity is detected, being arranged to provide input into the buffer store and to constitute a clock pulse.

In association with the above-mentioned embodiment, the input of the buffer store is preferably connected instead to the output of said first buffer store, which means that a clock pulse is produced when said second reader means read a character which differs from the character stored in said second buffer store.

Said means for controlling feed out of read-out results, suitably include an AND-element producing a strobe pulse, which element is arranged to receive as input signals, the clock pulses and a signal which comes from the counter when the latter's count is zero.

If the number of different characters is greater than two, said first reader means will be arranged foremost, viewed in the direction of motion of the data carrier relatively to the reader means, which corresponds with the given read-out direction.

As far as said first and second reader means are concerned, their active detector areas should be small in comparision with the area of a position. The sum of the distance between the centres of a co-operating pair of reader means, that is to say one first reader means and one second reader means, and the extension of the detecting area of each reader means should be less than the extension of a position, all extensions being reckoned in the direction of relative motion between the data carrier and the reader means. The reader means in each pair can advantageously be offset, viewed in a direction transversely of the direction of said relative motion, that is to say transversely of the direction of the lines on the data carrier.

In the event that successive, different characters are spaced a certain distance apart, the said distance between the centres of a pair of co-operating reader means should differ from the distance between the characters so that the two reader means of a pair do not simultaneously detect the commencement and end of a character.

It should be noted that the present invention, likewise in the case where successive characters on the data carrier are assumed to be different, can generally be used in association with conventional coded data carriers since the codes used generally permit the coding of a special character signifying "same as preceding character", if this is required. Considering binary coded decimal format with four binary elements or bits, it is accordingly possible for example to code not only the digits 1 to 9 but also the characters A and B, where A can stand for 0 and B for "same digit as preceding digit".

In case where there is a certain, generally completely empty space between each coded character on the data carrier, and each character, i.e. for example also a coded zero, includes at least any coded position, so that the corresponding column differs from said spaces, each of said spaces can be regarded as a special fictive character, which can be read-out in accordance with the invention and whose presence accordingly means that two successive characters on the data carrier are always different. After read-out, the fictive characters can simply be excluded, for example by arranging that only every other read-out character is fed out. The extension of each space in the direction of relative motion between data carrier and reader means, should be at least equal to the extension of the coded positions in the same direction.

Figure 2:
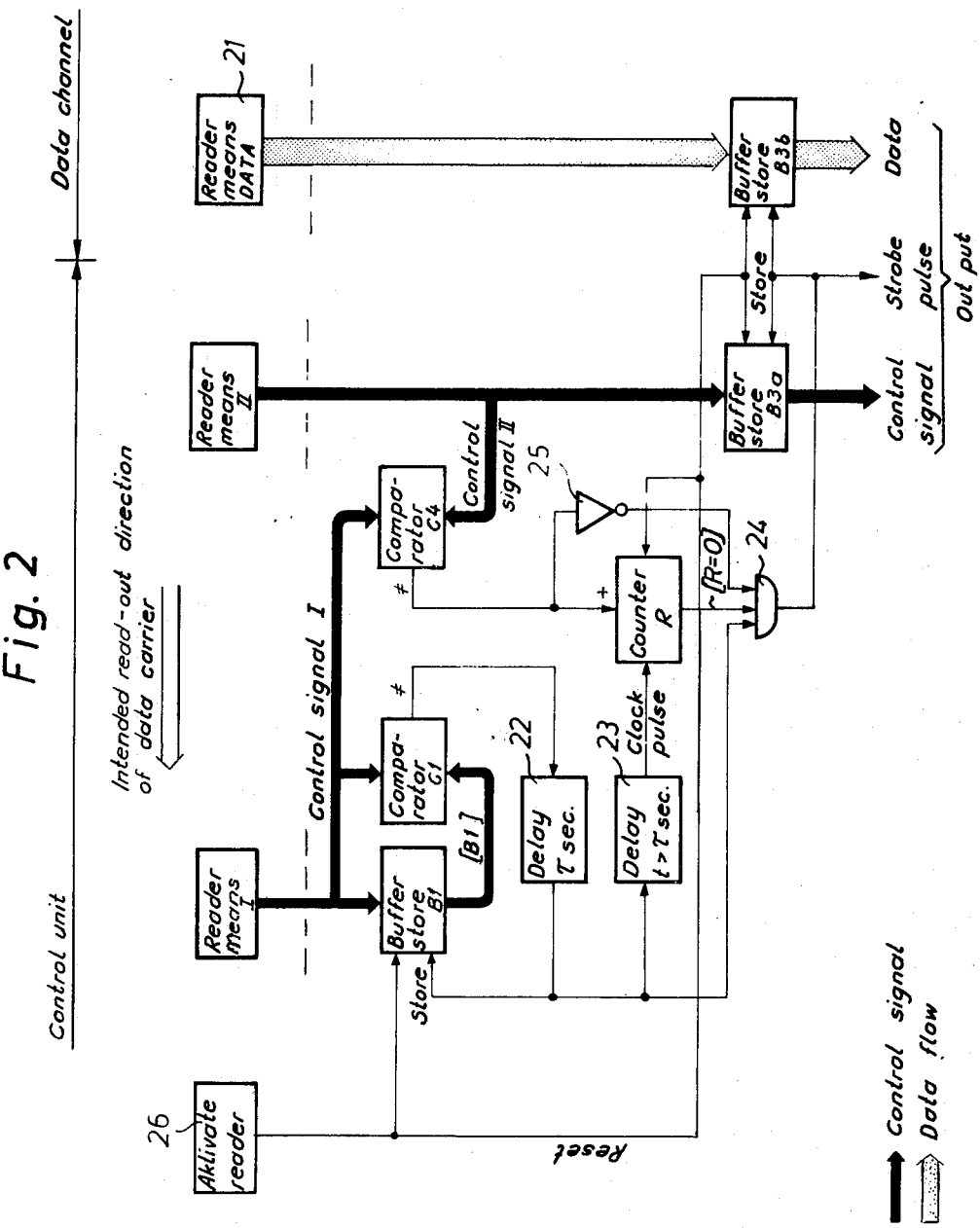
Figure 3:
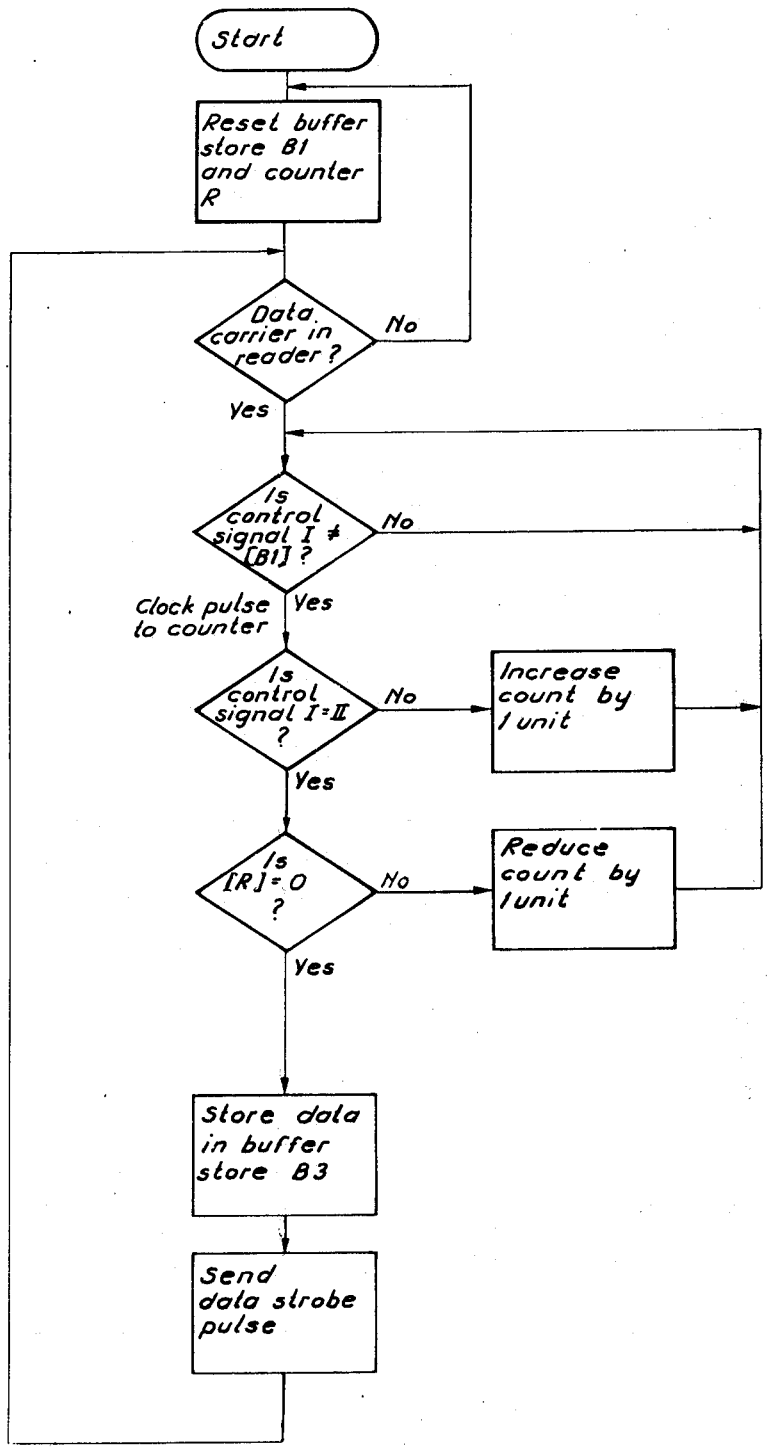
Figure 5A:
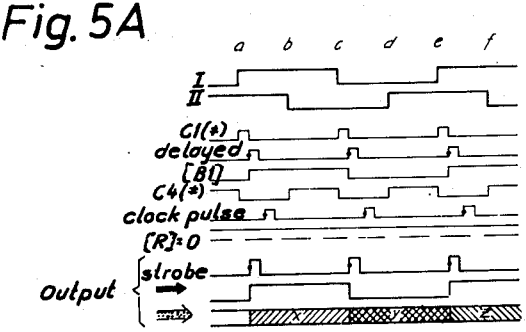
Figure 5B:
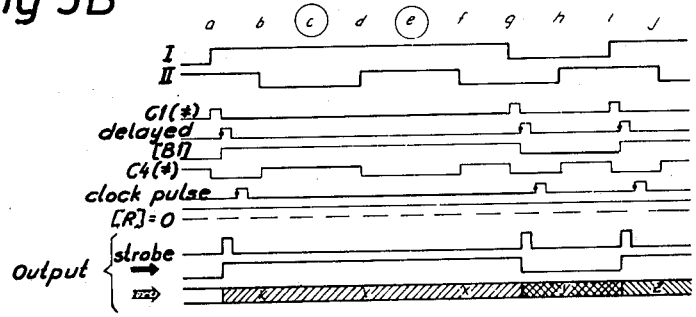
Figure 5C:
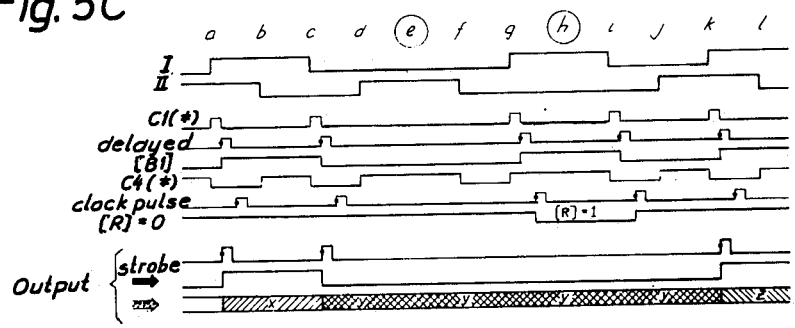
Figure 5D:
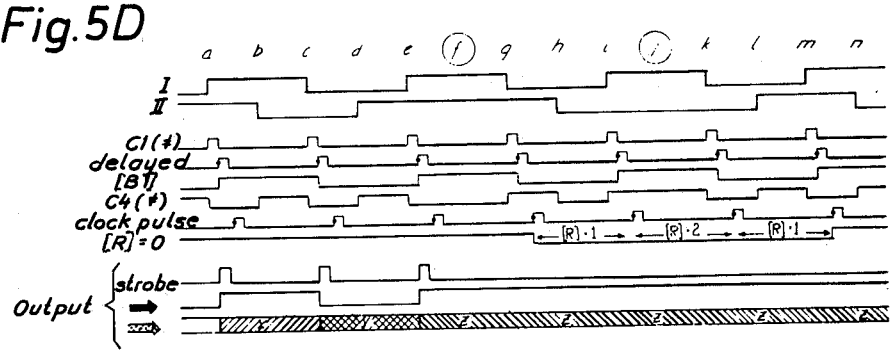
Figure 6:
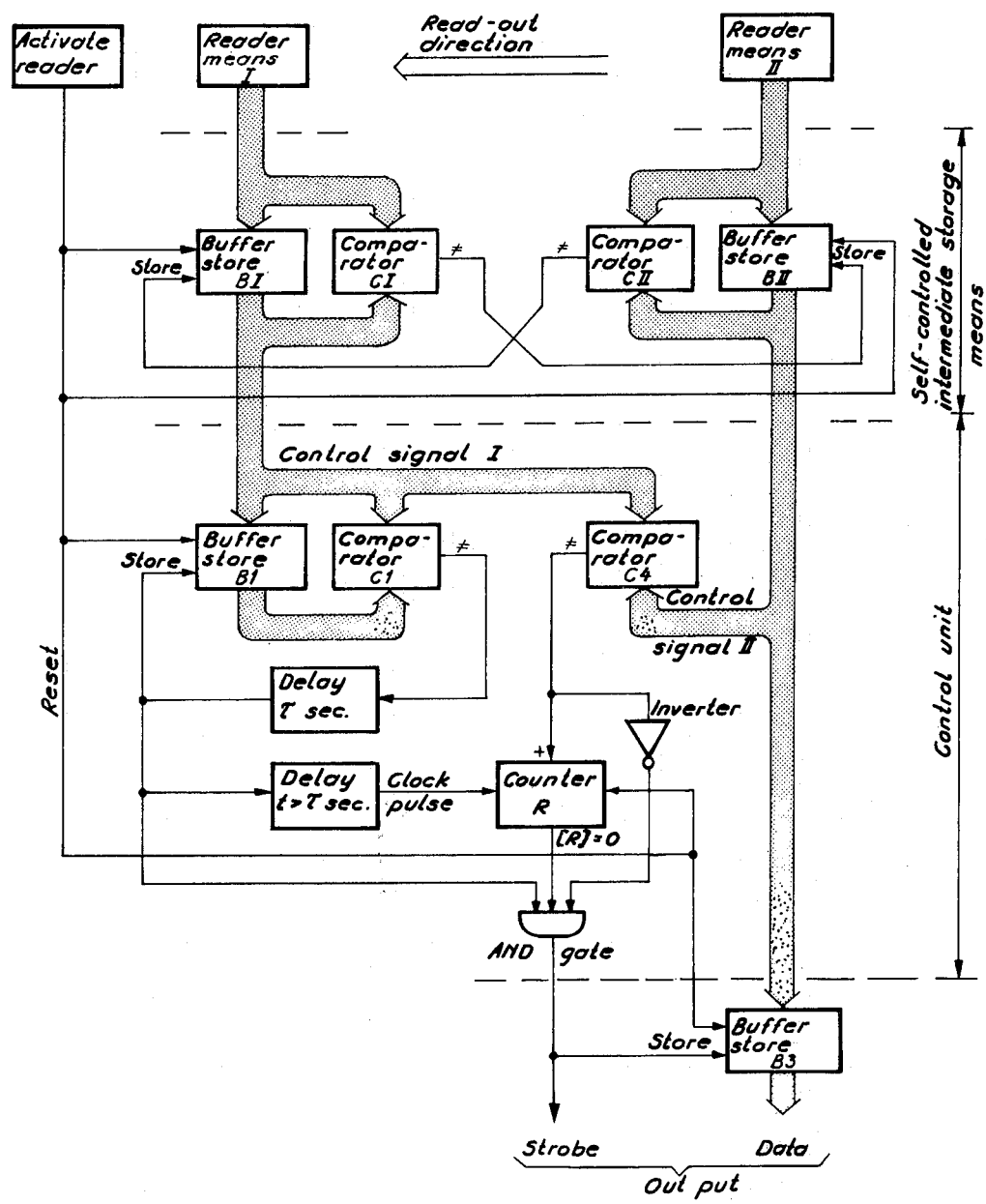
Figure 7:
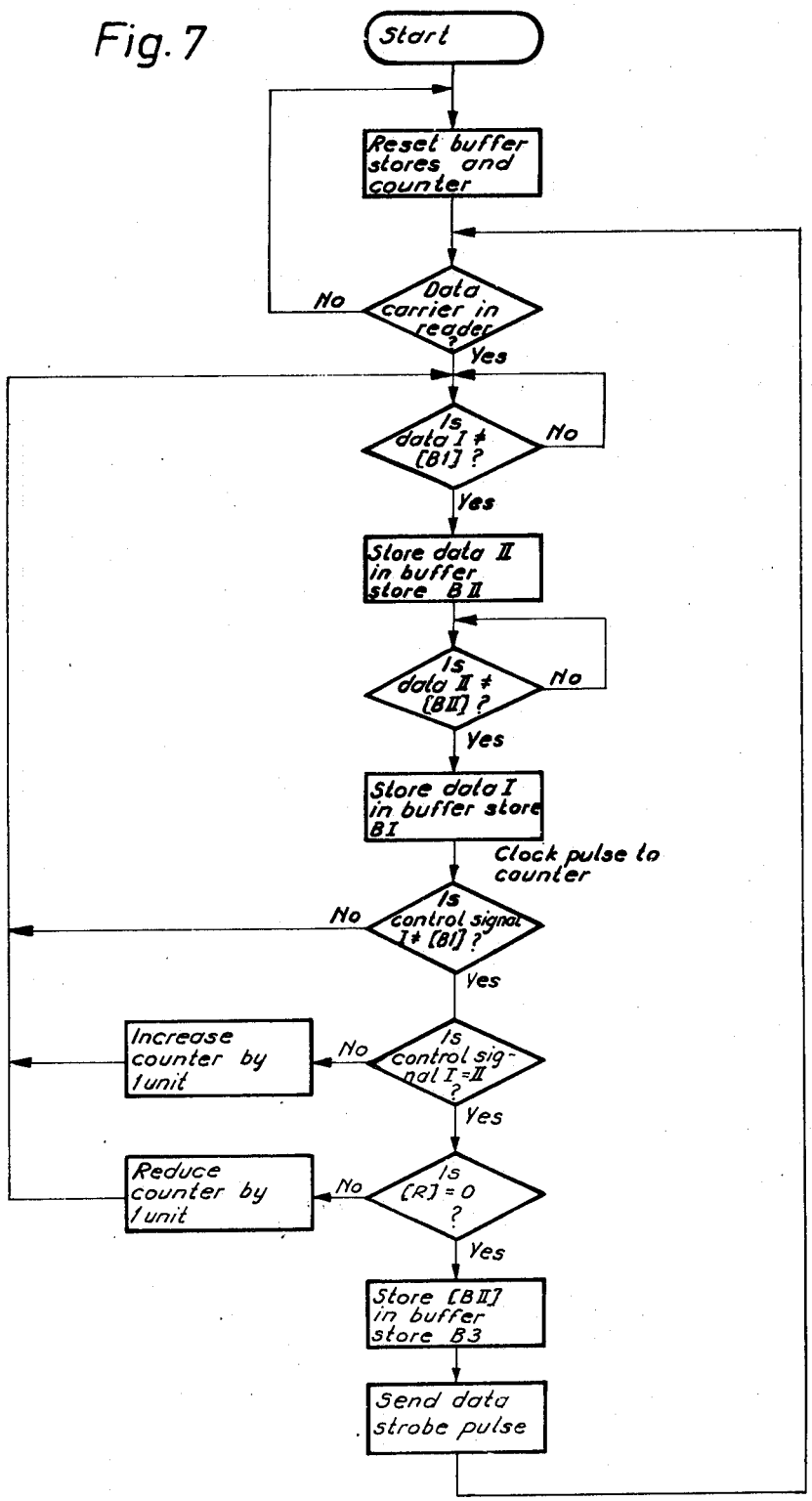
Figures 8A, 8B, 8C, 8D:
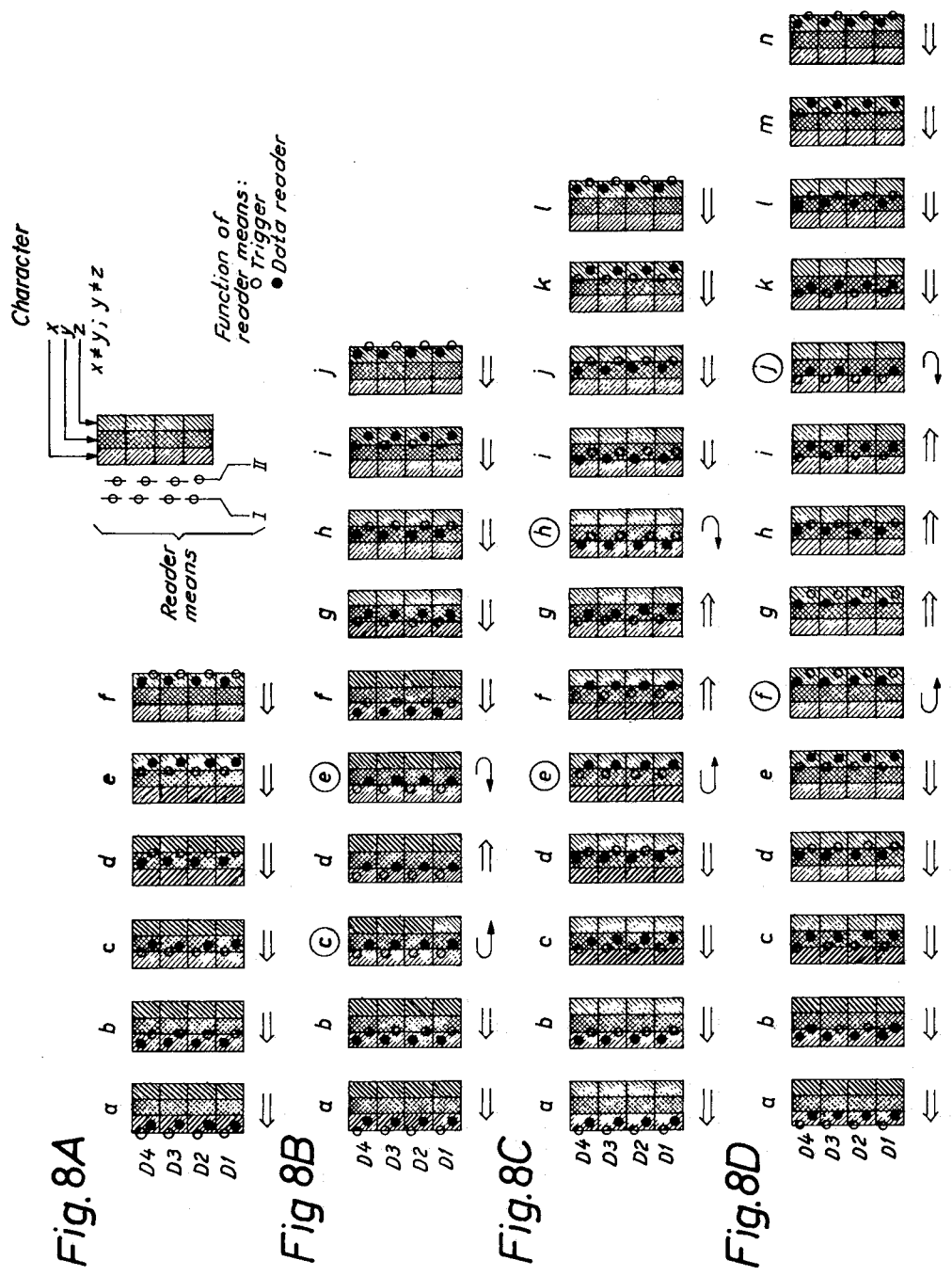
Figure 9A:
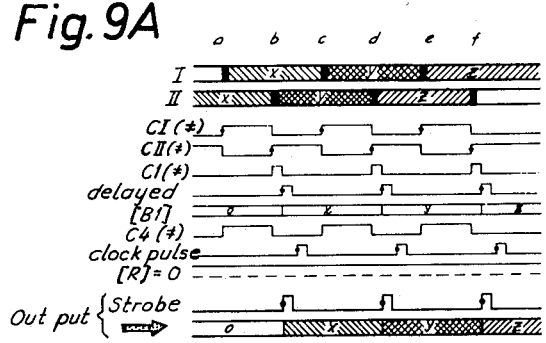
Figure 9B:
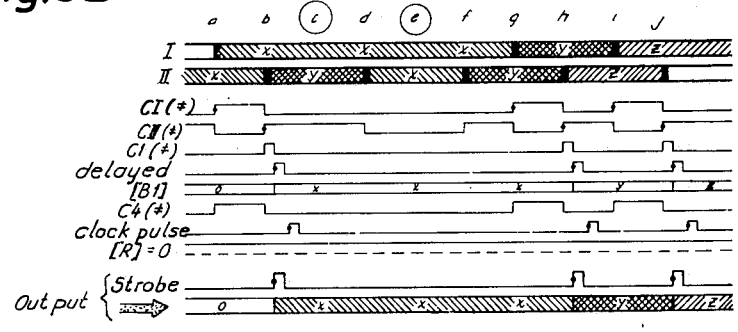
Figure 9C:
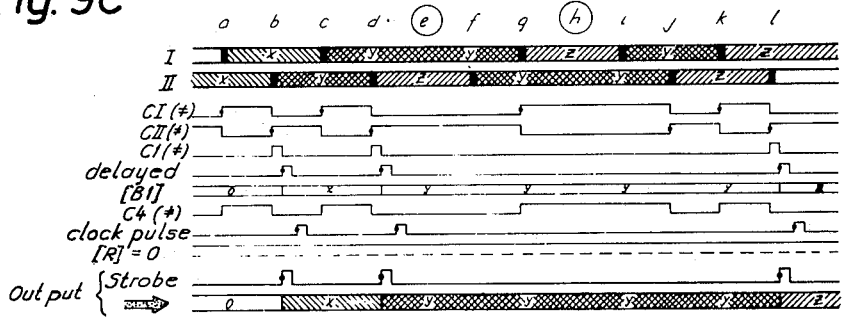
Figure 9D:
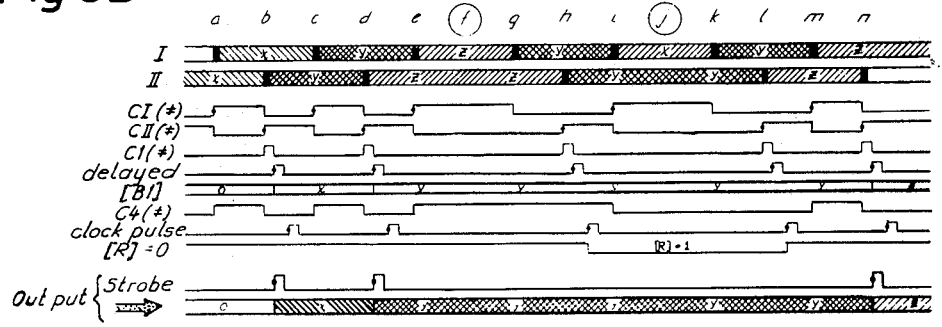
Figure 10:
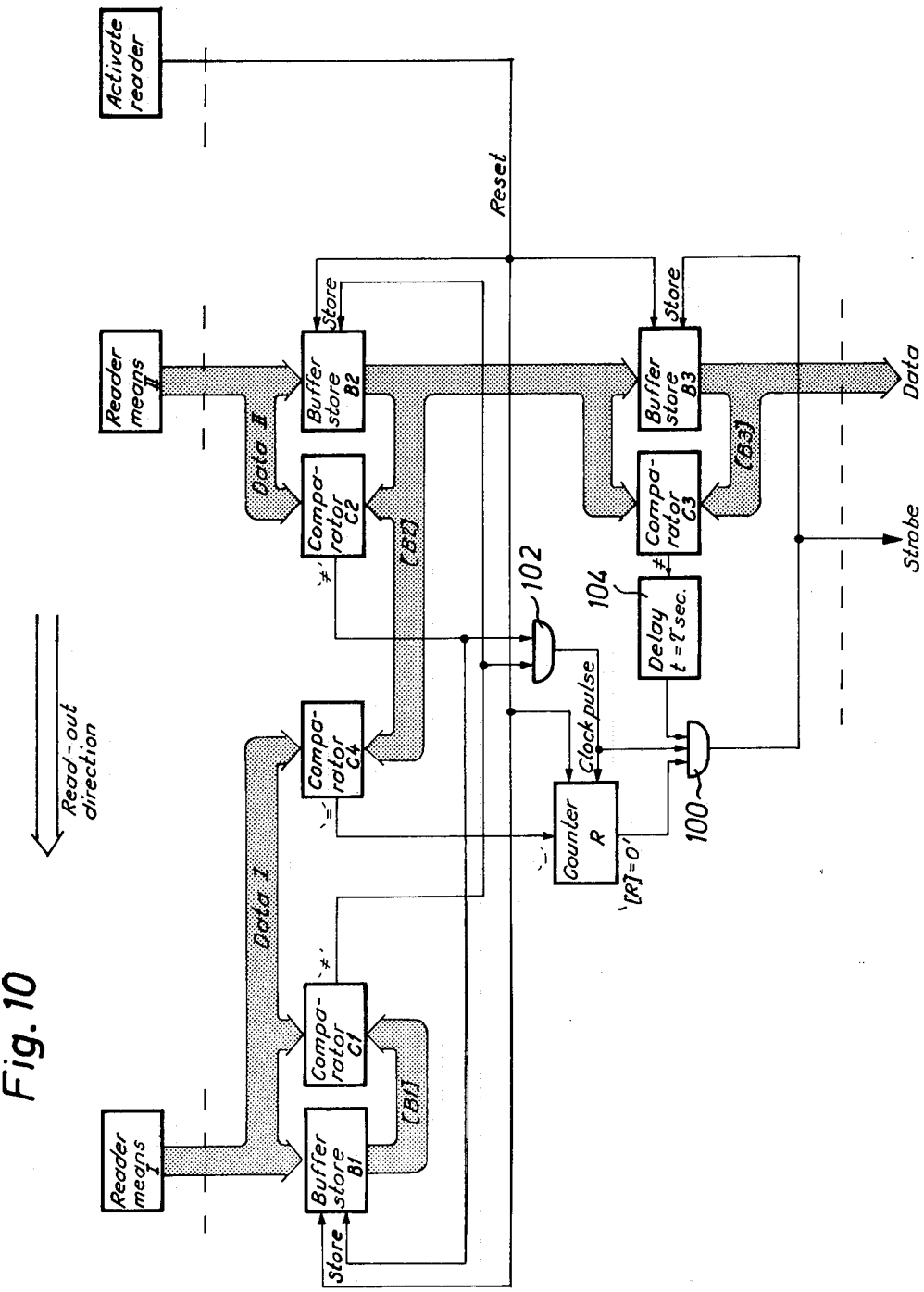

The invention will be described in more detail hereinafter by examples in association with the attached drawings, in which FIG. 1 schematically illustrates a design in the form of a plug-in unit of an arrangement in accordance with the invention for reading an ID card; FIG. 2 is a block diagram relating to an embodiment of an arrangement in accordance with the invention, which is intended to read data carriers provided with a special control channel, and which is suitable for use in the design illustrated in FIG. 1; FIG. 3 is a flow diagram pertaining to the arrangement of FIG. 2; FIG. 4, including 4A through 4D, is a sequential operational diagram pertaining to the arrangement of FIG. 2 illustrating four different data carrier feeds in relation to the reader means of the arrangement; FIG. 5, including 5A through 5D, is a timing diagram illustrating the wave forms of certain of the signals occurring in the arrangement shown in FIG. 2, in relation to the four different feeds illustrated in FIG. 4; FIG. 6 is a block diagram pertaining to another embodiment of the arrangement in accordance with the invention, which is suitable for use when the data carrier lacks a special control channel; FIG. 7 is a flow diagram pertaining to the arrangement of FIG. 6. FIG. 8, including 8A through 8D, is a sequential operational diagram pertaining to the arrangement of FIG. 6, illustrating four different data carrier feeds in relation to the reader means of the arrangement; FIG. 9, including 9A through 9D, is a timing diagram illustrating the wave forms of certain signals occurring in the arrangement of FIG. 8; FIG. 10 is a block diagram pertaining to another embodiment of the arrangement in accordance with the invention; and, finally, FIG. 11 is a flow diagram pertaining to the arrangement of FIG. 10.

In the figures of the drawings, identical or corresponding elements have been given the same reference numerals.

The plug-in unit 1 shown in FIG. 1 is designed to read an ID card 2, and comprises a back portion 3 designed to be introduced into a panel, operator's board or the like, and a front portion 4 which is provided with an opening 5 through which the ID card 2 can be inserted by hand into a slot in the unit for the purpose of readout. On the top of the unit a printed circuit board 6 is arranged which accommodates the requisite electronic units, indicated in the form of a number of integrated circuits 7, and is provided with a contact set 8 for connection to equipment used to display and/or further process the results of the read-out operation.

The card 2 is provided with binary coded information in a pattern of positions 10 comprising 5 lines and 13 columns. The central line constitutes a control channel with alternating binary zones and ones, so that in each column the central position is intended to be read out in order to supply a control signal controlling the readout of the other four, data-bearing positions.

To read the coded information on the card, a number of reader means 12 are arranged on the underside of the printed circuit board. The reader means, which have been illustrated purely schematically, comprise five means disposed in a column parallel to the columns and in line with the lines, on the card, plus one extra means which is disposed adjacent the central one of the five other means and is offset in relation thereto in the direction of feed of the card in the slot of the unit 1, the offset being less than the width of each position on the card in said same direction.

The pair of reader means thus disposed at the centre, are designed to read the control channel on the card and produce a control signal in a manner which will be described in more detail later. The central location means that any skewed positioning of the card in relation to the direction of feed has as little an effect as possible upon the desired simultaneous reading, at the correct instant, of the positions in each column. The other reader means constitute data reader means.

The reader means can be of any conventional type suitable in relation to the design of the coded markings on the card, but advantageously, when binary coding is used, can be constituted by silicon phototransistors which are capable of detecting infra-red light, whilst a corresponding set of luminescent diodes capable of producing infra-red light is assembled directly opposite on the outer side of the slot, each position on the card being coded by arranging that it either can or cannot pass infra-red light, depending upon whether the position is coded as a binary one or a binary zero. When the arrangement is activated, therefore, each silicon phototransistor detects the infra-red radiation which passes through the ID card from the associated luminescent diode.

The arrangement furthermore comprises a contact (not shown) for activating the system when a card is introduced into the slot. This contact can be of conventional design, for example of the kind which detects the presence of the material of which the card is made, and activates the arrangement as soon as the card has been fed a short distance into the slot, so that read-out can take place whilst the card is being fed right into the slot in the unit.

In FIGS. 2–5, the construction and operation of an arrangement in accordance with the invention have been shown, this arrangement being equipped with separate reader means for reading a control channel on the data carrier and with separate data reader means that is to say an arrangement of the kind intended for use in association with the design shown in FIG. 1. However, the arrangement is not limited to that illustrated although in the following discussion the arrangement uses six reader means, namely a first and a second reader means in a control unit, for reading a binary coded control channel on the data carrier, and four data reader means in a data channel, for reading data from the data carrier.

The arrangement shown in FIG. 2 thus comprises a first reader means I which is located foremost in the direction of motion of the data carrier past the reader means, which direction corresponds with the given direction of read-out, and a second reader means II, which two means together form said pair of reader means, plus data reader means 21. The arrangement furthermore comprises a buffer store B1, a comparator C1 and a comparator C4, the input of buffer store B1 and an input of each of comparators C1 and C4, being connected to reader means I. The output of buffer store B1 is connected to the second input of comparator C1, whilst the second input of comparator C4 is connected to reader means II.

The output signal from reader means I, which we shall call the control signal I, is a signal which either has a high (true) level or a low (false) level, depending upon whether the reader means I is for example detecting a binary one or a binary zero when reading a position, and is therefore continuously present at an input of both buffer store B1 and of comparators C1 and C4. A corresponding output signal from reader means II, which we shall call the control signal II, is continually available at the second input of comparator C4. The control signal II is also supplied to the input of an output buffer store B3$a$. The output signals from data reader means 21 are supplied to an output buffer store B3$b$.

The output of comparator C1 is connected via a delay element 22 (producing a delay of $\tau$ of the order of microseconds) to the "store" signal storage input of buffer store B1. The output of comparator C1 is marked ≠ meaning that the output signal is high (true), if the comparator indicates a disparity condition.

The arrangement furthermore comprises a counter R which is designed to be triggered to count forwards or backwards by clock pulses obtained, through a delay element 23 (producing a delay equal to $>\tau$ seconds), from the output of delay element 22. The counter R has an input for a forward/backward control signal which is obtained from the ≠ output of comparator C4. This input to counter R $i$ marked +, meaning that the counter will count forwards when the input signal to said input is high (true) and backwards when the input signal is low (false). The counter also has an output marked [R] =0, which is connected to an input of an AND-gate 24. A second input of AND-gate 24 is connected to the output of delay element 22 and a third input of the AND-gate is connected to the output ≠ of comparator C4, via an inverter 25. The output of AND-gate 24 is intended to produce strobe pulses in order to feed out read-out results, and is also connected to the store signal inputs of buffer stores B3$a$ and B3$b$. These two buffer stores accordingly operate in order, after a strobe pulse, to maintain at the output read-out results which can be fed out, until such time as the next strobe pulse arrives.

Finally, the arrangement comprises a contact 26 for activating it, which contact is arranged to produce, upon activation due to the introduction of the data carrier into the arrangement, a reset pulse which influences and clears all the buffer stores and the counter R.

Furthermore, the following applies to both the arrangement shown in FIG. 2 and the arrangements shown in the other figures:

Comparators:

These continuously compare the signals (control signal or data signals) at their inputs. If the signals exhibit disparity, the output signal at output $\neq$ is high (true). If the signals exhibit parity, then the signal at output = is high (true).

Buffer stores

These store the signal (control signals or data signal) appearing at the input, when the store command becomes true, i.e. when the signal at the store signal input becomes high (true) (positive flank). Immediately thereafter, the stored signal marked [B] becomes available at the output.

Counter

This counts one unit or step each time the clock pulse becomes high, i.e. with every positive flank. The counter cannot count negative values. Whether the counter counts forwards or backwards depends upon the signal appearing at the control signal input. If this input is marked +, then the counter counts forward in the presence of high (true) signal at the input, and backwards in the presence of low (false) signal at the input. If the input is marked — then the situation is the reverse. [R] = 0 signifies an output the signal from which is high (true) when the count is zero.

In the case of both buffer stores and counter, the reset function over-rides all other functions.

The operation of the arrangement shown in FIG. 2 is such that a clock pulse is delivered by buffer store B1, comparator C1 and delay element 22, every time reader means I reads out a new position in the control channel, that is to say every time a transition between two positions passes the reader means, by comparator C1 detecting disparity condition so that its output signal remains high. After passing the delay element, that is to say after the time $\tau$, the positive signal flank which thus results triggers buffer store B1 so that the new control signal from reader means I is fed into the store. As a consequence, comparator C1 will immediately detect the parity condition again so that its output signal again becomes low, i.e. the clock pulse acquires a length equal to $\tau$.

The clockpulse produced passes through delay element 23 to counter R which is operated in dependence upon the forward/backward control signal received from comparator C4 and upon existing count. The output signal from comparator C4 when reader means I is reading a new position, indicates the direction of motion of the data carrier relatively to the reader means. Thus, a high output signal (disparity condition) indicates that the direction is opposite to the intended read-out direction.

The clock signal is supplied to AND-gate 24 also and gives rise to a strobe pulse if the other inputs of the AND-gate are also receiving high signals.

The task of delay element 23 is to prevent a strobe pulse from being produced in the limiting condition where a clock pulse arrives when the count $i$ 1 ([R] = 1), and the output signal from comparator C4 is going to bring about backward counting to produce a count of zero. Delay element 23 must therefore contrive that the clock pulse has time to decay at the corresponding input to AND-gate 24, before that of the inputs of the AND-gate which is connected to counter R receives a high input signal due to the fact that the count of the counter has become zero following a backward counting step. Delay element 23 therefore produces a delay which is longer than the delay $\tau$ produced by delay element 22.

The function of inverter 25 is to ensure that the AND-gate only produces a strobe pulse if the direction of motion of the data carrier corresponds with the given direction of read-out, that is to say if the output signal from the comparator is low, indicating backward counting. Inverter 25 could be excluded if the corresponding input to AND-gate 24 were connected to a = output of comparator C4.

The remainder of the operation of the arrangement shown in FIG. 2 should be directly evident from a study of the associated flow diagram shown in FIG. 3, the sequential operating diagram of FIG. 4 and the signal diagram of FIG. 5. The flow diagram of FIG. 3 should be self-explanatory and therefore should require no further commentary here.

The sequential operating diagram of FIG. 4 illustrates four of the countless possible ways in which a data carrier, represented by three adjacent columns each comprising one control channel position and four data positions D1, D2, D3, and D4, representing the characters $x$, $y$ and $z$, respectively, can be fed past a set of reader means comprising two control signal reader means I and II and four data reader means 21. In respect of each of the variants A, B, C, and D, the successive positions of the data carrier are marked by small letters $a$, $b$, $c$ etc. The positions at which the direction of motion of the data carrier has been assumed to reverse, are marked by ringing them. The direction of motion of the data carrier relatively to the reader means, is marked in respect of each position, by an arrow 40.

The signal diagram of FIG. 5 illustrates in respect of the said four variants A, B, C, and D, the appearance of the signals at selected points in the arrangement of FIG. 2. FIG. 5A thus corresponds with FIG. 4A, FIG. 5B with FIG. 4B etc. etc. In each subsidiary figure of FIG. 5, the positions $a$, $b$, $c$, etc. correspond with the positions $a$, $b$, $c$, etc. in the corresponding subsidiary figures of FIG. 4. The signals illustrated in each subsidiary figure of FIG. 5, are arranged in the following order working from the top: control signal I, control signal II, output signal from comparator C1, said same output signal after delay by delay element 22, output signal from buffer store B1, output signal from comparator C4, signal appearing at the clock pulse input of the counter, output signal from the counter, signal at the strobe pulse output, signal at the control signal output and signal at the data output.

Thus, it will be seen that one strobe pulse is obtained in respect of each column, with the ensuing feeding out of all data read simultaneously, irrespective of whether the direction of motion of the data carrier should happen to change temporarily and irrespective of in what position the changes in direction of the feed motion occur.

In FIGS. 6–9, the construction and functioning of another embodiment of an arrangement in accordance with the invention, have been shown, said arrangement being particularly suitable for reading out a data carrier having no special control channel, that is to say a data carrier in which each column represents a character and in which successive characters are always different.

As FIG. 6 shows, this arrangement differs from that shown in FIG. 2 essentially in terms of the fact that a self-controlled intermediate store unit is connected directly after reader means I and II. Furthermore, both reader means I and reader means II, comprise as many reader means as there are positions in each column on the data carrier which is to be read, each position being intended to be read out by a pair of reader means comprising a means I and a means II, as FIG. 8 more clearly illustrates. The buffer stores and comparators used, are consequently in this instance all designed to store and compare, respectively, parallel-transmitted data signals representing characters, and not simply control signals in the way which was the case with the majority of the corresponding components in the arrangement of FIG. 2.

The intermediate storage unit comprises in respect of reader means I a buffer store BI and a comparator CI, and in respect of reader means II a buffer store BII and a comparator CII. The input of each buffer store and one input of the corresponding comparator, are connected to the associated reader means, whilst the second input of each comparator is connected to the output of the associated buffer store. The store signal input of buffer store BI is connected to the $\neq$ output of comparator CII, whilst the store signal input of buffer store BII is connected to the $\neq$ output of comparator CI. The inputs of the direction-detecting comparator C4, are connected to the outputs of buffer stores BI and BII.

The function of the intermediate storage unit is to trigger that when reader means I or II reads out a new character, new, that is, compared with the one stored in the associated buffer store BI or BII, respectively, this meaning that the associated comparator CI or CII produces an output signal which is high, the character which reader means II or I, respectively, reads out is then stored in the associated buffer store BII or BI, respectively.

The production of a clock pulse and the determination of the direction of motion of the data carrier, thus take place when reader means II reads out a new character and the character presented at the output of buffer store BI, changes. This means a delay compared with the situation occurring in the arrangement of FIG. 2, which delay ensures that characters read out by reader means I and II and used to control the arrangement, are always read out when the relevant reader means, relatively speaking is not just in the process of passing a character transition but is properly over a character. The effect in accordance with which the individual ones of the reader means I and II can detect transitions between successive positions in a line being read out, at different instants, with consequent unreliable character read-out, is thus eliminated.

The remainder of the mode of operation of the arrangement shown in FIG. 6, should be directly evident from a study of the associated flow diagram of FIG. 7, the sequential operating diagram of FIG. 8 and the signal diagram of FIG. 9, FIGS. 8 and 9 being designed in accordance with the same principles, which apply to FIGS. 4 and 5. In FIG. 8, furthermore, reader means I and II are distinguished by empty circles when they function as trigger elements for buffer stores BII and BI respectively, and by solid circles when they function as reader means supplying buffer stores BII and BI, respectively.

As will accordingly be apparent, the arrangement is controlled entirely by the coded characters on the data carrier. The speed with which the coded positions on the data carrier are moved past the reader means, thus has no significance as far as the operation of the arrangement is concerned since it is the absolute change in the output signals from the reader means, and not the change with respect to time, which controls input into the buffer stores and execution of the comparisons.

In FIG. 10, the block diagram of another embodiment of an arrangement in accordance with the invention can be seen, which utilizes intermediate storage. Buffer stores B1 and B2 and comparators C1 and C2 here operate in the same fashion as the intermediate storage unit in the arrangement of FIG. 6. Comparator C4 for determining the direction of motion of the data carrier, however, only has one of its inputs connected to the output of a buffer store, namely B2, whilst the other input of the comparator is connected directly to the associated reader means I.

This kind of construction has the advantage that comparator C4 produces what is tantamount to a continuous direction signal which only exhibits any uncertainty at the instant when input into buffer store B2 takes place and when reader means I is detecting a character transition.

The clock pulses to counter R and gate 100 for producing the strobe pulses, are produced in this embodiment when reader means II is reading a new character, new, that is, compared with the character which is held in buffer store B2, that is to say when the output signal from comparator C2 becomes high. Another condition, however, must be satisfied, namely that comparator C1 must detect disparity for which purpose the clock pulse input of counter R is connected to the outputs of comparators C2 and C1 via a second AND-gate 102. The extra condition ensures proper operation likewise in the situation where data carrier feed in a particular direction is disturbed by the data carrier being briefly moved forwards and backwards so that a character transition passes forwards and backwards past the reader means.

To ensure correct feed out in all conceivable kinds of feed situations, there is furthermore provided a circuit for ensuring that an additional condition is satisfied vis-a-vis feed out, namely that when a strobe pulse could otherwise be produced and data fed out, said data should differ from the data which were fed out in association with the production of the preceding strobe pulse. This circuit comprises a buffer store B3, a comparator C3 and a signal delay element 104. The input of buffer store B3 and one input of comparator C3, are connected to the output of buffer store B2. The other input of comparator C3 is connected to the output of buffer store B3, and the $\neq$ output of comparator C3 is connected to an input of AND-gate 100 via delay element 104. The store signal input of buffer store B3 is connected to the strobe pulse output of the AND-gate. It should be clear, therefore, that the length of the strobe pulse is equivalent to the delay introduced by delay element 104.

For the rest, the operation of the arrangement should be clear from the associated flow diagram of FIG. 11, especially in the light of what has been said earlier on in the present description.

As far as the special circuit designs for the arrangements described, are concerned, no further information should be required since the arrangements can readily be put together by a person skilled in the art using conventional circuit elements of the kind intended in the present context. For example, by way of a multi-channel buffer store it is possible to use a Fairchild 9300 circuit and by way of a single-channel buffer store a Texas Instruments 7474 circuit. By way of a single-channel comparator, it is possible to use a convenntional EXCLUSIVE-OR gate and as a multi-channel comparator a number of EXCLUSIVE-OR gates corresponding to the number of channels, said gates with open collectors being coupled together. The counter for example could be constituted by a forward-/backward counter type SN 74191, as manufactured for example by Texas Instruments.

Although the present invention has been described in the context of the example of its application to the reading of coded data carriers, it should be evident that the fundamental principle of the invention is applicable wherever it is desired to determine the position of a mobile object carrying coded markings, relatively to another object equipped with reader means.

Thus, the first object can be provided with a series of for example binary coded characters which are simply of two different kinds and which alternate so that successive characters are always different. In the simplest case, the characters may be a series of binary coded positions yielding a sequence 0-1-0-1-0 etc.

The other object is equipped with first and second reader means in accordance with the present invention. The reader means can be coupled into an arrangement of the kind shown in FIG. 2 for example, although data reader means, buffer stores 3a and 3b and the AND-gate, are not necessary and the counter can be suitably modified so it can count unrestrictedly in both directions. If a predererminded count, preferably zero, corresponds with a predetermined relative position between said first and second objects, then accordingly any other count, be it positive or negative, will unambiguously define how the objects have moved in relation to one another.

It is of course possible, in a corresponding way, to modify the arrangements of FIGS. 6 and 10. In association with a modified arrangement of the kind shown in FIG. 10 it is thus possible to produce what is almost a continuous signal indicating the instantaneous direction of motion of the first object relatively to the other object. If the object rotates, then this means that the direction of rotation is determined.

What is claimed is:

1. A method of reading coded information from a data carrier in which information is present in the form of at least one line of coded positions and in which the coded positions constitute characters, each character including the positions in a corresponding column of the columns formed by a predetermined number of lines, said number of lines including one in which each position in a specific line constitutes a character, the method comprising the steps of:

moving the data carrier and reader means relatively to one another so that said at least one line is relatively displaced past said reader means;

reading the characters thus passing said reader means;

detecting the direction of the data carrier motion relatively to said reader means;

increasing a count in dependence upon the number of characters which pass said reader means if the direction of the relative motion is opposite to a given read-out direction;

reducing the count in dependence upon the number of characters passing said reader means if the direction of the relative motion corresponds with the given read-out direction until the count reaches zero; and feeding out the result of read-out of a character read if the direction of the data carrier relative motion corresponds with the given read-out direction and the count is zero.

2. A method as claimed in claim 1, further including the step of using said read-out result as a control signal for controlling the feeding out of the result of read-out of other positions simultaneously read on the data carrier.

3. A method as claimed in claim 2, in which two successive ones of said characters on the data carrier are always different and wherein;

said reading step includes reading by means of first and second reader means which, viewed in the direction of relative motion between the data carrier and said reader means, are spaced apart a distance less than the width of a position in said same direction; and said direction detecting step includes comparing the results of read-out by said first and second reader means.

4. A method as claimed in claim 3, including the steps of:

detecting when said first reader means reads a new character;

comparing the new character said first reader means is beginning to read and the character said second reader means is reading; and modifying the count in dependence upon the result of the comparison.

5. A method as claimed in claim 4, wherein said reading step includes using as said first reader means, the reader means located foremost viewed in the direction of motion of the data carrier relatively to the reader means, which corresponds with the given read-out direction;

said modifying step includes increasing the count by one unit if the result of said comparison exhibits disparity, and reducing the count by one unit if the result of said comparison is parity and the count exceeds zero; and said feeding out step includes feeding out the result of read-out, if the result of said comparison is parity and the count is zero.

6. A method as claimed in claim 5, wherein each character comprises more than one position, and the method includes the steps of:

storing the character which said second reader means is reading when said first reader means begins to to read a new character; and thereafter carrying out said comparing step by comparing said stored character and the character which said first reader means is reading when said second reader mens reads a new character.

7. A method as claimed in claim 6, including the step of detecting whether said second reader means is reading a new character by comparing said stored character with the character said second reader means is reading.

8. A method as claimed in claim 4, wherein said step of detecting when said first reader means reads a new character includes comparing the character said first reader means is reading with the character which said first reader means was reading when the preceeding comparison took place between the characters said first and second reader means were then reading.

9. A method as claimed in claim 6, including the steps of:
storing each new character which said first reader means is reading when said second reader means reads a new character; and
detecting whether said first reader means is reading a new character by comparing the character last stored with the character said first reader means is reading.

10. A method as claimed in claim 1, in which two successive ones of said characters on the data carrier are always different and wherein;
said reading step includes reading by means of first and second reader means which, viewed in the direction of relative motion between the data carrier and said reader means, are spaced apart a distance less than the width of a position in said same direction; and
said direction detecting step includes comparing the results of read-out by said first and second reader means.

11. A method as claimed in claim 10, including the steps of:
alternatingly using said first reader means to detect a transition between successive characters and said second reader means for character read-out, and using said first reader means for character read-out and said second reader means to detect a transition between successive characters;
providing character read-out when a transition between succeeding characters is detected by the reader means used for that purpose.
providing change over after character read-out; and
comparing results obtained with read-out by means of said first and second reader means used as character reader means for determining the direction of relative motion between the data carrier and the reader means.

12. A method as claimed in claim 11, including the steps of:
storing the character which said second reader means is reading when said first reader means, used for transition detection, detects a transition; and
comparing the character which said first reader means is reading with the stored character for producing a signal indicating the direction of relative motion between the data carrier and the reader means.

13. A method as claimed in claim 12, wherein said reading step includes using as said first reader means, the reader means which is located foremost considered in the direction of motion of the data carrier relatively to the reader means, which corresponds with the given read-out direction; and
said comparing step includes producing a signal indicating that the direction of relative motion is the given read-out direction when the comparison shows parity and producing a signal indicating that the direction of relative motion is opposite to the given read-out when the comparison shows disparity.

14. A method as claimed in claim 12, including the steps of:
storing the character which said first reader means is reading when said second reader means, used for transition detection, detects a transition; and
detecting a character transition by comparing the character the relevant means reads and the last stored character received therefrom.

15. A method as claimed in claim 12, including the steps of:
detecting each character transition occurring at one of said first and second reader means;
modifying the count, upon the detection of each such character transition, in dependence upon the direction indicating signal and upon the magnitude of the count;
controlling the count and said signal; and
feeding out, on detection of such a character transition, a read-out result provided said count is zero and said signal indicates that the direction of relative motion corresponds with the given read-out direction.

16. A method as claimed in claim 12, including the steps of:
when detecting a character transition by said second reader means used for transition detection, comparing the character which said first reader means is then reading with the character which said first reader means was reading when the preceding character transition was detected by said second reader means used for transition detection;
if the comparison shows that the characters compared differ from each other, modifying the count in dependence upon said direction indicating signal and upon the magnitude of the count; and
if the count is zero at least after having been modified, comparing the stored character read by said second reader means with the stored character present at the preceding occasion of feed out and feeding out a read-out result provided that the last-mentioned comparison shows disparity.

17. A method as claimed in claim 10, including the steps of:
detecting when said first reader means reads a new character;
comparing the new character said first reader means is beginning to read and the character said second reader means is reading; and
modifying the count in dependence upon the result of the comparison.

18. A method as claimed in claim 17, wherein said reading step includes using as said first reader means, the reader means located foremost viewed in the direction of motion of the data carrier relatively to the reader means, which corresponds with the given read-out direction;
said modifying step includes increasing the count by one unit if the result of said comparison exhibits disparity, and reducing the count by one unit if the result of said comparison is parity and the count exceeds zero; and said feeding out step includes feeding out the result of read-out, if the result of said comparison is parity and the count is zero.

19. A method as claimed in claim 18, wherein each character comprises more than one position, and the method includes the steps of:
storing the character which said second reader means is reading when said first reader means begins to to read a new character; and
thereafter carrying out said comparing step by comparing said stored character and the character which said first reader means is reading when said second reader means reads a new character.

20. A method as claimed in claim 19, including the step of detecting whether said second reader means is reading a new character by comparing said stored character with the character said second reader means is reading.

21. A method as claimed in claim 17, wherein said step of detecting when said first reader means reads a new character includes comparing the character said first reader means is reading with the character which said first reader means was reading when the preceding comparison took place between the characters said first and second reader means were then reading.

22. A method as claimed in claim 19, including the steps of:
storing each new character which said first reader means is reading when said second reader means reads a new character; and
detecting whether said first reader means is reading a new character by comparing the character last stored with the character said first reader means is reading.

23. A method as claimed in claim 11, including the steps of:
using as said first reader means, the reader means which is located foremost, viewed in the direction of motion of the data carrier relatively to the reader means, which direction corresponds with the given read-out direction;
storing when detecting a transition by said first reader means used for transition detection, the character which said second reader means is reading;
storing, when detecting a transition by said second reader means used for transition detection, the character which said first reader means is reading;
determining whether the latter character differs from the previously stored character read by said first reader means and, if so, comparing the two stored characters;
increasing the count by one unit if the compared characters are different;
reducing the count, if exceeding zero, by one unit if the characters are the same; and
if the characters are the same and the count is zero at least after having been reduced, comparing said same characters with the same characters present at the preceding occasion of feed out and feeding out read-out result provided that the last-mentioned comparison shows disparity.

24. A method as claimed in claim 11, when said characters comprise only two different types, the method including the steps of:
storing, upon a transition being detected by said first reader means used for transition detection, the character which said second reader means is reading;
storing, upon a transition being detected by said second reader means used as for transition detection, the character which said first reader means is reading;
determining whether the latter character differs from the previously stored character read by said first reader means and, if so, comparing the two stored characters, the comparison giving one of a first and second possible results;
increasing the count by one unit if the comparison gives a first result;
reducing the count, if exceeding zero, by one unit if the comparison gives a second result; and
if the comparison gives said second result and the count is zero at least after having been reduced, comparing the character last stored with the last stored character associated with the preceding occasion of feed out and feeding out a read-out result provided that the last-mentioned comparison shows disparity.

25. A method as claimed in claim 11, wherein there is included the step of using said read out result as a control signal for controlling the feeding out of the read out of other positions simultaneously read out on the data carrier.

26. A method as claimed in claim 25, including the steps of:
storing the character which said second reader means is reading when said first reader means, used for transition detection, detects a transition; and
comparing the character which said first reader means is reading with the stored character for producing a signal indicating the direction of relative motion between the data carrier and the reader means.

27. A method as claimed in claim 26, wherein said reading step includes using as said first reader means, the reader means which is located foremost considered in the direction of motion of the data carrier relatively to the reader means, which corresponds with the given read-out direction; and
said comparing step includes producing a signal indicating that the direction of relative motion is the given read-out direction when the comparison shows parity and producing a signal indicating that the direction of relative motion is opposite to the given read-out when the comparison shows disparity.

28. A method as claimed in claim 25, including the steps of:
using as said first reader means, the reader means which is located foremost, viewed in the direction of motion of the data carrier relatively to the reader means, which direction corresponds with the given read-out direction;
storing when detecting a transition by said first reader means used for transition detection, the character which said second reader means is reading;
storing, when detecting a transition by said second reader means used for transition detection, the character which said first reader means is reading;
determining whether the latter character differs from the previously stored character read by said first reader means and, if so, comparing the two stored characters;
increasing the count by one unit if the compared characters are different;

reducing the count, if exceeding zero, by one unit if the characters are the same; and if the characters are the same and the count is zero at least after having been reduced, comparing said same characters with the same characters present at the preceding occasion of feed out and feeding out read-out result provided that the last-mentioned comparison shows disparity.

29. A method as claimed in claim 25, when said characters comprise only two different types, the method including the steps of:

storing, upon a transition being detected by said first reader means used for transition detection, the character which said second reader means is reading;

storing, upon a transition being detected by said second reader means used as for transition detection, the character which said first reader means is reading;

determining whether the latter character differs from the previously stored character read by said first reader means and, if so, comparing the two stored characters, the comparison giving one of a first and second possible results;

increasing the count by one unit if the comparison gives a first result;

reducing the count, if exceeding zero, by one unit if the comparison gives a second result; and if the comparison gives said second result and the count is zero at least after having been reduced, comparing the character last stored with the last stored character associated with the preceding occasion of feed out and feeding out a read-out result provided that the last-mentioned comparison shows disparity.

30. A method as claimed in claim 26, including the steps of:

storing the character which said first reader means is reading when said second reader means, used for transition detection, detects a transition; and detecting a character transition by comparing the character the relevant means reads and the last stored character received therefrom.

31. A method as claimed in claim 26, including the steps of:

detecting each character transition occurring at one of said first and second reader means;

modifying the count, upon the detection of each such character transition, in dependence upon the direction indicating signal and upon the magnitude of the count.

controlling the count and said signal; and feeding out, on detection of such a character transition, a read-out result provided said count is zero and said signal indicates that the direction of relative motion corresponds with the given read-out direction.

32. A method as claimed in claim 26 including the steps of:

when detecting a character transition by said second reader means used for transition detection, comparing the character which said first reader means is then reading with the character which said first reader means was reading when the preceding character transition was detected by said second reader means used for transition detection;

if the comparison shows that the characters compared differ from each other, modifying the count in dependence upon said direction indicating signal and upon the magnitude of the count; and if the count is zero at least after having been modified, comparing the stored character read by said second reader means with the stored character present at the preceding occasion of feed out and feeding out a read-out result provided that the last-mentioned comparison shows disparity.

33. An arrangement for reading coded information from a data carrier in which information is present in the form of at least one line of coded positions and in which the coded positions constitute characters, each character including the positions in a corresponding column of the columns formed by a predetermined number of lines, said number of lines including one in which each position in a specific line constitutes a character, the arrangement comprising:

reader means for reading the characters on the data carrier;

said data carrier being movable relative to the reader means so that said at least one line of characters may be relatively displaced past said reader means for the purpose of character-by-character read out;

a counter;

means for supplying clock pulses to said counter in dependence upon the number of characters passing the reader means;

means for detecting the direction of motion of the data carrier relatively to the reader means for providing a control signal to the counter so that the counter counts forward in respect of each clock pulse when said direction of motion is opposite to a predetermined direction of read-out, and counts backwards when said direction of motion corresponds with the given direction of read-out, provided that the count exceeds zero; and means arranged, in dependence upon the count of the counter, to control the feeding out of result of read out by the reader means.

34. An arrangement as claimed in claim 33, for use with a data carrier carrying further information and further including:

reader means for reading said further information; and means for controlling the feeding out of read-out of said further information in dependence upon operation of said count-controlled feeding out means.

35. An arrangement as claimed in claim 33, in which two successive characters are always different, and wherein the arrangement comprises first and second reader means which, viewed in the direction of relative motion between the data carrier and the reader means, are spaced apart a distance less than the width of a coded position in said same direction, and which are arranged to read out said characters, said means for supplying counter control signals comprising comparator means arranged to compare results obtained at read-out by said first and second reader means.

36. An arrangement as claimed in claim 35, wherein one input of said comparator means is connected to said first reader means; and the other input of said comparator means is connected to said second reader means.

37. An arrangement as claimed in claim 36, wherein at least one of the inputs of said comparator means is connected to the associated reader means via an intermediate storage means.

38. An arrangement as claimed in claim 37, wherein a first buffer store and one input of a first comparator are connected to said first reader means, the other input of said first comparator being connected to the output of said first buffer store; and a second buffer store and one input of a second comparator are connected to said second reader means, the other input of said second comparator being connected to the output of said second buffer store, input into said first buffer store being arranged to take place when the output signal from said second comparator indicates disparity and input into said second buffer store being arranged to take place when the output signal from said first comparator indicates disparity, and at least one of the inputs to said comparator means being connected to the output of the buffer store belonging to the associated reader means.

39. An arrangement as claimed in claim 38, wherein said means for producing clock pulses comprises a buffer store and a comparator, the input of the buffer store and one input of the comparator being connected to the output of said first buffer store, and the buffer store output being connected to the other input of the comparator, the output signal from the comparator, when a disparity condition is detected, being arranged to produce input into the buffer store and to act as clock pulse.

40. An arrangement as claimed in claim 39, wherein said means for controlling feed out of read-out results comprises an AND-element which is arranged to receive as input signals the clock pulses and a signal coming from the counter when the latter's count is zero.

41. An arrangement as claimed in claim 35 wherein said means for producing clock pulses comprises means for supplying a pulse every time one of said first and second reader means reads a transition between successive characters.

42. An arrangement as claimed in claim 41, wherein said means for producing clock pulses comprises a buffer store and a comparator, the input of the buffer store and one input of the comparator being connected to one of said first and second reader means, and the output of the buffer store being connected to the second input of the comparator, the output signal from the comparator, when a disparity condition is detected, being arranged to produce input into the buffer store and to act as clock pulse.

43. An arrangement as claimed in claim 42, wherein said means for controlling feed-out of read out results comprises an AND-element which is arranged to receive as input signals the clock pulses and a signal coming from the counter when the latter's count is zero, and an input signal in the form of a signal from said comparator means, which indicates parity.

44. An arrangement as claimed in claim 35 wherein said means for controlling feed out of read-out results comprises an AND-element which is arranged to receive as input signals the clock pulses and a signal coming from the counter when the latter's count is zero.

45. An arrangement as claimed in claim 35, in which the number of different characters is greater than two, characterized in that said first reader means is located foremost, viewed in the direction of motion of the data carrier relatively to the reader means which corresponds with the given direction of read-out.

46. An arrangement as claimed in claim 38, wherein said means for producing clock pulses comprisea an AND-gate with two inputs which are connected to the outputs of said first and second comparators, the AND-gate being arranged to produce a clock pulse when both the first comparator and the second comparator indicate disparity.

47. An arrangement as claimed in claim 46, wherein means for controlling feed out of read-out results comprises an AND-element which is arranged to be supplied with input signals in the form of clock pulses, a signal coming from the counter when its count is zero, and a signal from a comparator one of whose inputs is connected to said second buffer store and the other of whose inputs is connected to the output of a buffer store the input of which is connected to said second buffer store and which is supplied as a "store" input signal with the output signal from the AND-element.

* * * * *